United States Patent [19]
Ariyoshi

[11] Patent Number: 5,668,515
[45] Date of Patent: Sep. 16, 1997

[54] SUPERCONDUCTIVE MAGNET APPARATUS

[75] Inventor: Akihiko Ariyoshi, Hyogo-ken, Japan

[73] Assignee: Mitsubishi Denki Kabushiki Kaisha, Tokyo, Japan

[21] Appl. No.: 510,072

[22] Filed: Aug. 1, 1995

[30]    Foreign Application Priority Data

Aug. 8, 1994 [JP]  Japan ................................ 6-186048

[51] Int. Cl.$^6$ ........................................................ H01F 1/00
[52] U.S. Cl. .......................... 335/216; 335/199; 324/318
[58] Field of Search .............................. 335/216, 296, 335/297, 298, 299; 324/318

[56]              References Cited

U.S. PATENT DOCUMENTS

| 4,390,840 | 6/1983 | Ganssen et al. | 324/309 |
| 4,788,502 | 11/1988 | Keller et al. | 324/318 |

FOREIGN PATENT DOCUMENTS 144802  7/1986  Japan .

*Primary Examiner*—Lincoln Donovan
*Attorney, Agent, or Firm*—Sughrue, Mion, Zinn, Macpeak & Seas

[57]              ABSTRACT

To achieve a superconductive magnet apparatus which can suppress the consumption of liquid helium even if a quench phenomenon occurs in the superconductive coil to prevent a reduction in its cooling ability. The superconductive magnet apparatus comprises a superconductive coil 3 which is immersed in liquid helium 2 and stored in the helium container 1, an induction coil 12 which is magnetically coupled to the superconductive coil 3 and thermally insulated from the helium container 1 from each other, and a switching element 14 which forms a closed circuit 13 between both ends of the induction coil 12 when it is made active.

10 Claims, 3 Drawing Sheets

11 POWER SOURCE FOR MAGNETIZATION AND DEMAGNETIZATION

8 PROTECTIVE ELEMENT

SUPERCONDUCTIVE MAGNET APPARATUS

BACKGROUND OF THE INVENTION

1. Field of the Invention

This invention relates to a superconductive magnet apparatus for use in a medical magnetic resonance imaging device and the like.

2. Description of Prior Art

FIG. 5 is a schematic sectional view of a prior art superconductive magnet apparatus and FIG. 6 is a circuit diagram of the superconductive magnet apparatus of FIG. 5.

In these figures, reference numeral 1 represents a helium container in which liquid helium 2 is stored, 3 a superconductive coil which is immersed in the liquid helium 2 and stored in the helium container 1, and 4 and 5 radiation heat shields arranged to double-enclose the helium container 1.

Reference numeral 6 represents a vacuum container arranged to enclose the radiation heat shield 5 and contain the helium container 1 and the radiation heat shields 4 and 5 in a vacuum atmosphere. Numeral 7 denotes a refrigerator for cooling the radiation heat shields 4 and 5. The helium container 1, the radiation heat shields 4 and 5, and the vacuum container 6 are thermally insulated from one another.

As shown in FIG. 6, to the superconductive coil 3 are connected a protective element 8 and a permanent current switch 9 (to be abbreviated as PCS hereinafter) in parallel to each other which are coupled to a power source 11 for magnetization and demagnetization provided outside the vacuum container 6 by a power supply lead 10.

To operate the superconductive magnet apparatus constructed as described above, the power supply lead 10 is first attached and then a current is supplied from the power source 11 for magnetization and demagnetization to carry out magnetization. Thereafter, when a predetermined magnetic field output is achieved, the PCS 9 is turned on to keep the current in the superconductive coil 3 (permanent current mode). Thereby, a high and stable magnetic field particular to the superconductive magnet apparatus can be obtained. Thereafter, to minimize the penetration of heat, the power supply lead 10 is removed to complete magnetization.

Meanwhile, for demagnetization, the power supply lead 10 is attached and a current for magnetization is supplied by the power source 11 for magnetization and demagnetization to turn off the PCS 9. The current is then made null by the power source 11 for demagnetization and the power supply lead 10 is removed to complete demagnetization.

Since the superconductive magnet apparatus of the prior art is constructed as described above, when a quench phenomenon occurs in the superconductive coil 3 for some reason or another, the liquid helium contained in the helium container 1 is consumed in large quantity because the superconductive coil 3 is arranged isolatedly within the helium container 1, almost all the energy of the superconductive coil 3 is changed into Joule heat by resistance generated by the quench, and the temperature of the superconductive coil 3 is elevated by the heat.

SUMMARY OF THE INVENTION

The present invention has been made to overcome the above-mentioned problem of the prior art and it is therefore an object of the invention to achieve a superconductive magnet apparatus which can suppress the consumption of liquid helium even if a quench phenomenon occurs in the superconductive coil.

A superconductive magnet apparatus claimed in claim 1 of the invention comprises a helium container in which liquid helium is stored, a superconductive coil which is immersed in the liquid helium and stored in the helium container, radiation heat shields which are arranged to enclose the helium container, a vacuum container arranged to enclose the radiation heat shields, for storing the helium container and the radiation heat shields in a vacuum atmosphere, wherein the apparatus further comprises an induction coil which is magnetically coupled to the superconductive coil and thermally insulated from the helium container, and a switching element which forms a closed circuit between both ends of the induction coil when it is made active.

Further, in a superconductive magnet apparatus claimed in claim 2 of the invention, the induction coil is installed inside the radiation heat shields in the constitution of claim 1.

Still further, in a superconductive magnet apparatus claimed in claim 3 of the invention, the induction coil is installed inside the vacuum container in the constitution of claim 1.

Still further, in a superconductive magnet apparatus claimed in claim 4 of the invention, the induction coil is installed inside a magnetic shield arranged outside the vacuum container in the constitution of claim 1.

Still further, in a superconductive magnet apparatus claimed in claim 5 of the invention, when a voltage higher than a predetermined value is excited in the induction coil, the switching element becomes active in the constitution of claim 1.

Still further, in a superconductive magnet apparatus claimed in claim 6 of the invention, when a voltage higher than a predetermined value is excited between taps taken out from two predetermined positions of the superconductive coil, the switching element becomes active in the constitution of claim 1.

Still further, in a superconductive magnet apparatus claimed in claim 7, a plurality of induction coils are provided in the constitution of claim 1 or 6.

In the superconductive magnet apparatus claimed in claim 1 of the invention, the induction coil is magnetically coupled to the superconductive coil to take out part of the energy of the superconductive coil, and the switching element forms a closed circuit between both ends of the induction coil to consume the energy taken out by the induction coil.

In the superconductive magnet apparatus claimed in claim 2 of the invention, the induction coil is installed inside the radiation heat shields.

In the superconductive magnet apparatus claimed in claim 3 of the invention, the induction coil is installed inside the vacuum container.

In the superconductive magnet apparatus claimed in claim 4 of the invention, the induction coil is installed inside the magnetic shield arranged outside the vacuum container.

In the superconductive magnet apparatus claimed in claim 5 of the invention, when a voltage higher than a predetermined value is excited in the induction coil, the switching element becomes active to form a closed circuit between both ends of the induction coil.

In the superconductive magnet apparatus claimed in claim 6 of the invention, when a voltage higher than a predetermined value is excited between taps taken out from two predetermined positions of the induction coil, the switching element becomes active to form a closed circuit between both ends of the induction coil.

In the superconductive magnet apparatus of claim 7 of the invention, a plurality of induction coils are provided.

The above and other objects, features and advantages of the invention will become more apparent from the following description when taken in conjunction with the accompanying drawings.

DESCRIPTION OF THE PREFERRED EMBODIMENT

Embodiment 1

Figure 1:
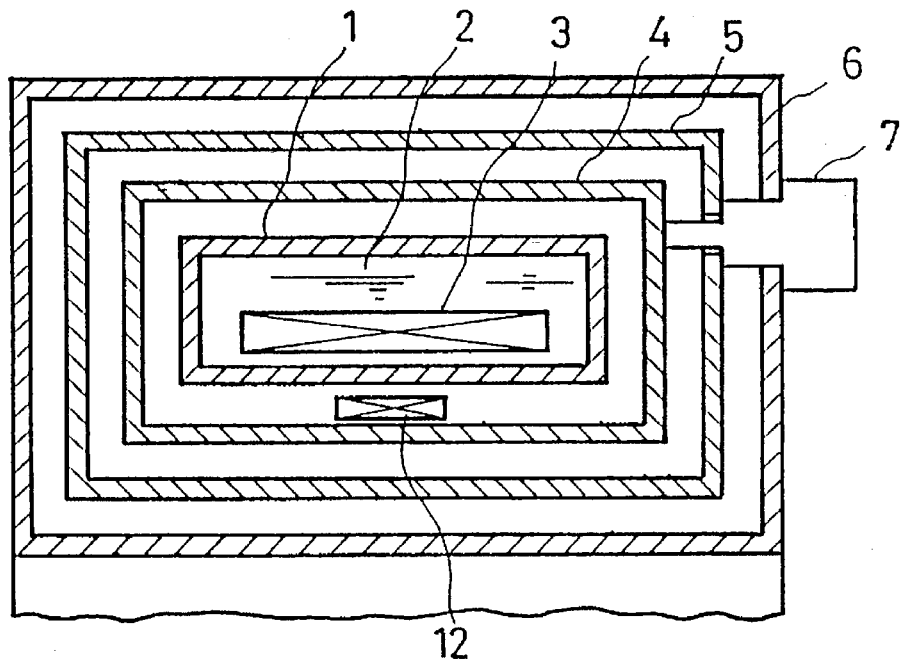
FIG. 1 is a schematic sectional view of a superconductive magnet apparatus according to Embodiment 1 of the invention.
Figure 2:
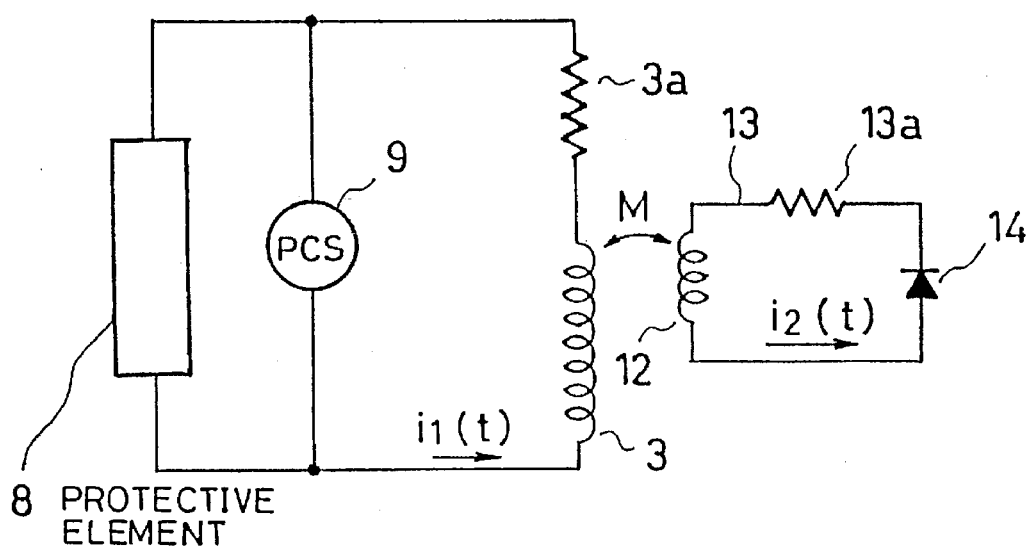
FIG. 2 is a circuit diagram of the superconductive magnet apparatus FIG. 1.

Preferred embodiments of the present invention will be described hereinunder with reference to the accompanying drawings. FIG. 1 is a schematic sectional view of a superconductive magnet apparatus according to Embodiment 1 of the present invention. FIG. 2 is a circuit diagram of the superconductive magnet apparatus of FIG. 1.

Figure 5:
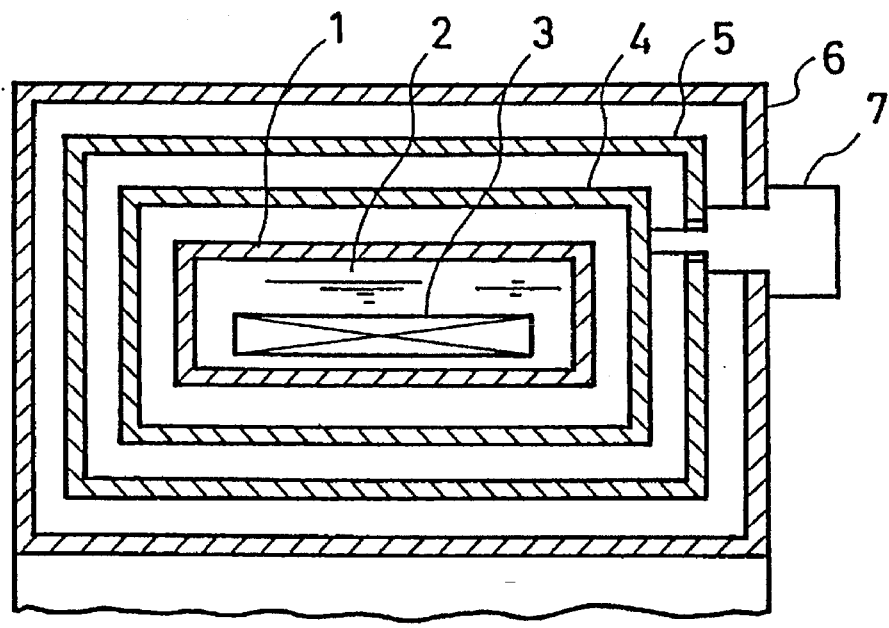
FIG. 5 is a schematic sectional view of a prior art superconductive magnet apparatus.
Figure 6:
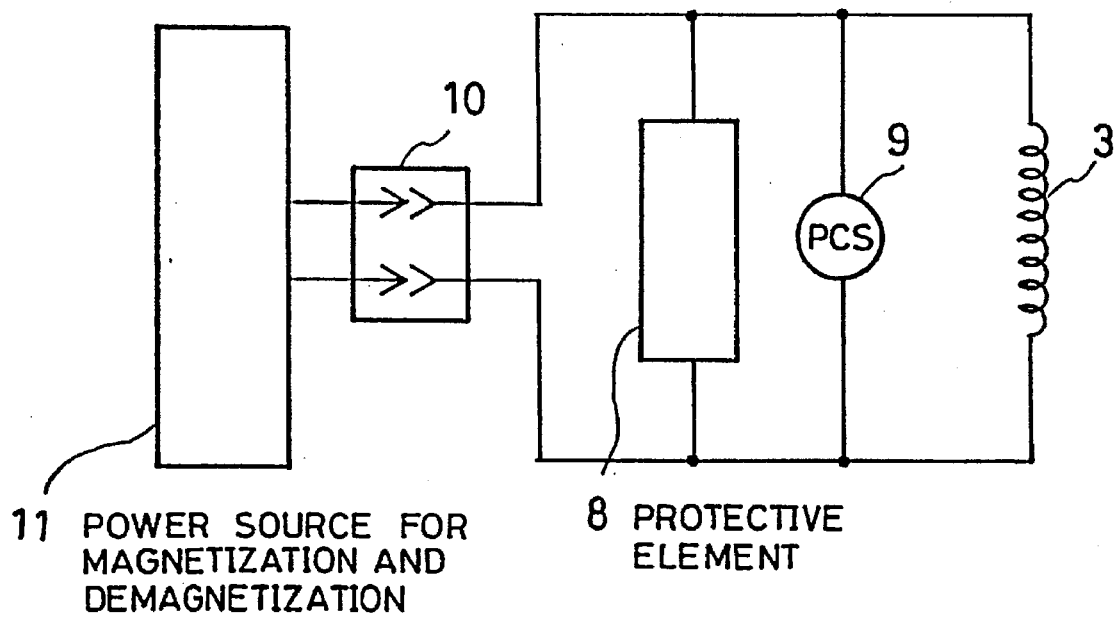
FIG. 6 is a circuit diagram of the superconductive magnet apparatus of FIG. 5.

In these figures, the same or corresponding components as in FIG. 5 and FIG. 6 are given the same reference codes and, accordingly, their descriptions are omitted.

Reference numeral 12 represents an induction coil magnetically coupled to the superconductive coil 3 and thermally insulated from the helium container 1 installed inside the radiation heat shield 4. Numeral 13 denotes a closed circuit formed by the activation of a switching element to be described later and connected to both ends of the induction coil 12, having resistance 13a. In this instance, the resistance 13a may be either resistance that the induction coil 12 has itself or resistance connected to the induction coil 12. Numeral 14 represents the switching element which is composed of a diode or the like and becomes active when a voltage higher than a predetermined value is excited in the induction coil 12, and 3a is resistance generated in the superconductive coil 3 by a quench.

A description is subsequently given of the operation of the superconductive magnet apparatus constructed as described above when a quench occurs in the superconductive coil 3.

Immediately after a quench occurs, a current $i_1(t)$ running through the superconductive coil 3 decreases to satisfy the following expression (1):

$$L_1 * di_1(t)/dt + R_1(t) * i_1(t) = 0 \quad (1)$$

wherein $L_1$ is the inductance of the superconductive coil 3 and $R_1(t)$ is resistance generated by the quench.

At this time, an induction voltage $M * di_1(t)/dt$ is generated in the induction coil 12 by mutual inductance M between the induction coil 12 and the superconductive coil 3.

The switching element 14 is turned on by this induction voltage to form the closed circuit 13 so that an induction current $i_2(t)$ runs therethrough. The current variation rate $di_2(t)/dt$ of this induction current is several tens to several hundreds of amperes per second which is approximately several hundred to several thousand times that of a current running upon magnetization and demagnetization of the superconductive magnet apparatus. Consequently, if mutual inductance M between the superconductive coil 3 and the induction coil 12 as well as the diode of the switching element 14 is set to appropriate values, the switching element 14 does not become active upon magnetization and demagnetization of the superconductive magnet apparatus, but can be made active only when a quench occurs in the superconductive coil 3.

As described above, when the closed circuit 13 is formed by the activation of the switching element 14, part of the energy of the superconductive coil 3 is transmitted to the closed circuit 13 through the induction coil 12, and the induction current $i_2(t)$ runs through the closed circuit 13. Joule heat is generated by the resistance 13a of the closed circuit 13. This generated heat is consumed only to heat the radiation heat shield 4 and the induction coil 12 because the radiation heat shield 4 and the helium container 1 are thermally insulated from each other. Further, since the radiation heat shield 4 is cooled by the refrigerator 7, it returns to a low temperature in relatively a short period of time.

Meanwhile, since the superconductive coil 3 loses part of its energy which has been transmitted to the induction coil 12, Joule heat generated by the resistance 13a which is generated in the superconductive coil 3 by a quench decreases and a rise in the temperature of the superconductive coil 3 is alleviated, thereby suppressing the consumption of the liquid helium.

Embodiment 2

Figure 3:
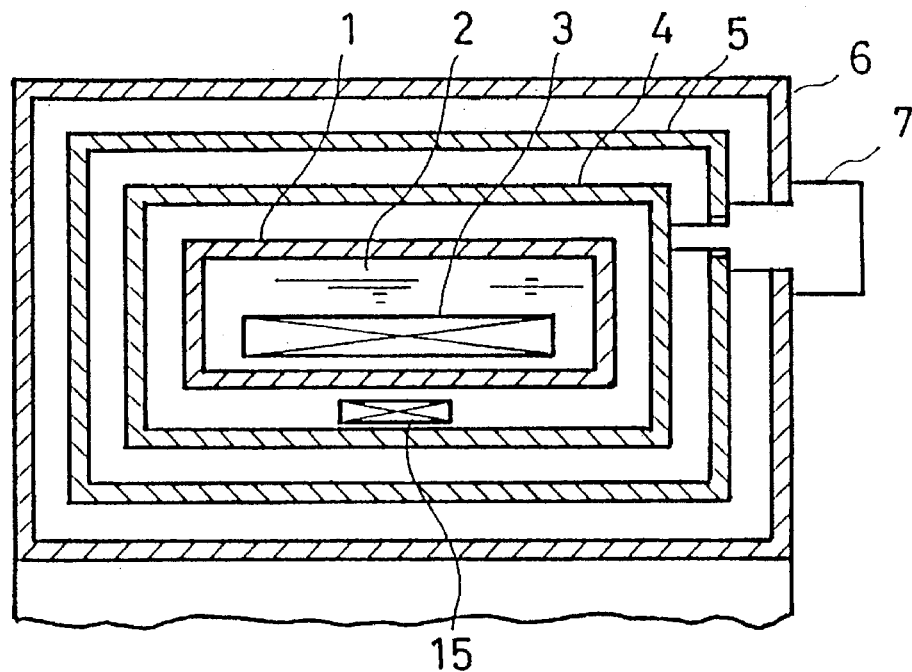
FIG. 3 is a schematic sectional view of a superconductive magnet apparatus according to Embodiment 2.
Figure 4:
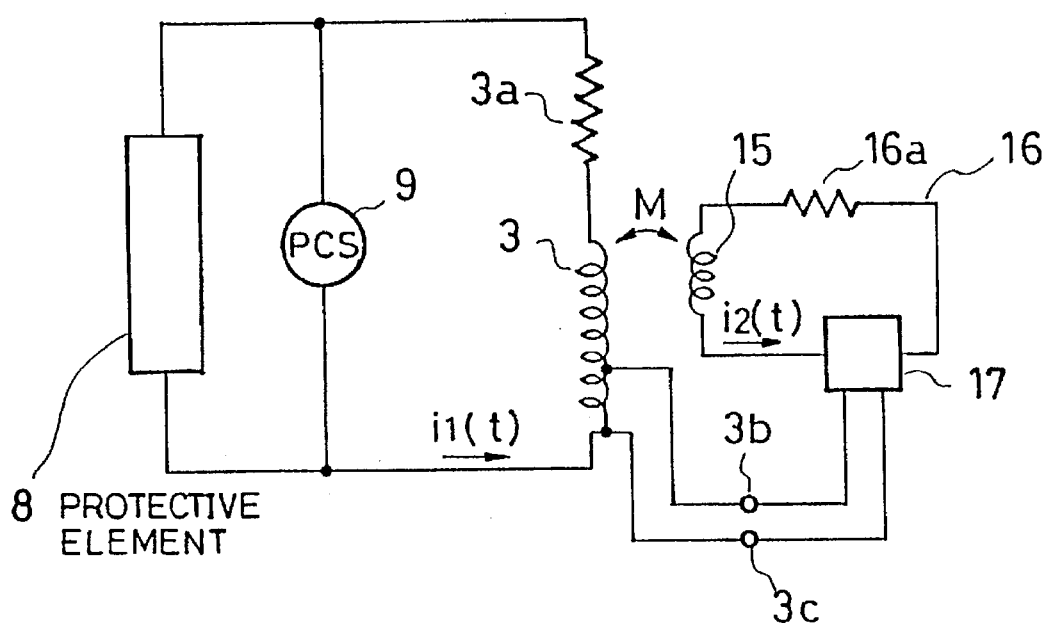
FIG. 4 is a circuit diagram of the superconductive magnet apparatus FIG. 3.

FIG. 3 is a schematic sectional view of a superconductive magnet apparatus according to Embodiment 2 of the invention. FIG. 4 is a circuit diagram of the superconductive magnet apparatus of FIG. 3.

In these figures, the same or corresponding components as those in Embodiment 1 of FIG. 1 and FIG. 2 are given the same reference codes and, accordingly, their descriptions are omitted.

Reference numeral 15 represents an induction coil which is magnetically coupled to the superconductive coil 3 and thermally insulated from the helium container 1 installed inside the vacuum container 6. Denoted at 3b and 3c are a pair of taps taken out from two predetermined positions of the superconductive coil 3, and 16 a closed circuit formed by the activation of a switching element to be described later and connected to both ends of the induction coil 15, having resistance 16a. The resistance 16a may be either resistance that the induction coil has itself or resistance connected to the induction coil. Denoted at 17 is the switching element which is composed of a thyristor, for example, and becomes active when a voltage higher than a predetermined value is excited between the taps 3b and 3c.

A description is subsequently given of the operation of the superconductive magnet apparatus of Embodiment 2 constructed as described above when a quench occurs in the superconductive coil 3.

Immediately after the quench occurs, a current $i_1(t)$ running through the superconductive coil 3 decreases to satisfy the above-mentioned expression (1) as described in Embodiment 1. At this time, a voltage generated between the tapes 3b and 3c is expressed by the following expression (2):

$$(K/N)L_1 * di_1(t)/dt \quad (2)$$

wherein N is the number of turns of the superconductive coil 3 and K is the number of turns between the taps 3b and 3c.

The switching element 1 is made active by the voltage generated between the taps 3b and 3c to form the closed circuit 16 so that an induction current $i_2(t)$ runs therethrough. Consequently, if the voltage value by which the switching element 17 is made active is set to an appropriate value, the switching element 17 does not become active upon magnetization and demagnetization of the superconductive magnet apparatus, but can be made active only when a quench occurs in the superconductive coil 3.

As described above, when the closed circuit 16 is formed by the activation of the switching element 17, part of the energy of the superconductive coil 3 is transmitted to the closed circuit 16 through the induction coil 15, and an induction current $i_2(t)$ runs through the closed circuit 16, Joule heat is generated by the resistance 16a of the closed circuit 16. Thereafter, this generated heat is consumed only to heat the vacuum container 6 and the induction coil 15 because the vacuum container 6 and the helium container 1 are thermally insulated from each other. Further, since the vacuum container 6 is directly exposed to the air, it is cooled by the open air and returns to a low temperature in relatively a short period of time. Meanwhile, the superconductive coil 3 loses part of its energy which has been transmitted to the induction coil 15, Joule heat generated by the resistance 13a which is generated in the superconductive coil 3 by a quench decreases and a rise in the temperature of the superconductive coil 3 is alleviated, thereby suppressing the consumption of the liquid helium. Moreover, since the induction coil 15 is installed inside the vacuum container 6 which is relatively rigid, a structurally stable apparatus can be constructed.

Embodiment 3

In the above-described Embodiments 1 and 2, each of the induction coils 12 and 15 is installed inside the radiation heat shield 4 and the vacuum container 6, but they may be installed inside a magnetic shield which is provided outside the vacuum container 6 to limit leakage flux. It is needless to say that the same effect as the above-described Embodiments can be obtained by this Embodiment 3, and the assembly of components is easy because it can be performed outside the vacuum container 6.

Embodiment 4

In the above Embodiments 1 to 3, only one induction coil 12 or 15 is provided, but a plurality of induction coils may be provided. Each induction coil can be reduced in size due to the provision of a plurality of induction coils and the plurality of induction coils can be respectively installed inside the radiation heat shields 4 and 5, the vacuum container 6 and the like, thus making it easy to select installation positions.

As described on the foregoing pages, according to the invention claimed in claim 1, in the superconductive magnet apparatus comprising a helium container in which liquid helium is stored, a superconductive coil which is immersed in the liquid helium and stored in the helium container, radiation heat shields which are arranged to enclose the helium container, and a vacuum container arranged to enclose the radiation heat shields, for storing the radiation heat shields and the helium container in a vacuum atmosphere, since the apparatus further comprises an induction coil which is magnetically coupled to the superconductive coil and thermally insulated from the helium container, and a switching element which forms a closed circuit between both ends of the induction coil when it is made active, the consumption of the liquid helium can be suppressed even if a quench phenomenon occurs in the superconductive coil.

According to the invention claimed in claim 2, in the superconductive magnet apparatus claimed in claim 1, since an induction coil is installed inside the radiation heat shields, the consumption of the liquid helium can be suppressed even if a quench phenomenon occurs in the superconductive coil and yet the elevated temperature of the induction coil can be returned to a low temperature in relatively a short period of time.

Further, according to the invention claimed in claim 3, in the superconductive magnet apparatus claimed in claim 1, since the induction coil is installed inside the vacuum container, the consumption of the liquid helium can be suppressed even if a quench phenomenon occurs in the superconductive coil and yet the elevated temperature of the induction coil can be returned to a low temperature in relatively a short period of time.

Still further, according to the invention claimed in claim 4, in the superconductive magnet apparatus claimed in claim 1, since the induction coil is installed inside the magnetic shield provided outside the vacuum container, the consumption of the liquid helium can be suppressed even if a quench phenomenon occurs in the superconductive coil and yet the installation of the induction coil can be made easily.

Still further, according to the invention claimed in claim 5, in the superconductive magnet apparatus claimed in claim 1, since the switching element is made active when a voltage higher than a predetermined value is excited in the induction coil, the consumption of the liquid helium can be suppressed even if a quench phenomenon occurs in the superconductive coil.

Still further, according to the invention claimed in claim 6, in the superconductive magnet apparatus claimed in claim 1, since the switching element is made active when a voltage higher than a predetermined value is excited between taps taken out from two predetermined positions of the superconductive coil, the consumption of the liquid helium can be suppressed even if a quench phenomenon occurs in the superconductive coil.

Still further, according to the invention claimed in claim 7, in the superconductive magnet apparatus claimed in claim 1 or 6, since a plurality of induction coils are provided, the consumption of the liquid helium can be suppressed even if a quench phenomenon occurs in the superconductive coil and yet a reduction in the size of the induction coil and the selection of installation positions are made easily.

What is claimed is:

1. A superconductive magnet apparatus comprising a helium container in which liquid helium is stored, a superconductive coil which is immersed in the liquid helium and stored in the helium container, radiation heat shields which are arranged to enclose the helium container, and a vacuum container arranged to enclose the radiation heat shields, for storing the helium container and the radiation heat shields in a vacuum atmosphere, wherein the apparatus further comprises an induction coil which is magnetically coupled to the superconductive coil and thermally insulated from the helium container, and a switching element which forms a closed electrical circuit between both ends of the induction coil when said switching element is made active, said closed circuit having a resistance which dissipates energy of the superconductive coil when said switching element is made active.

2. The superconductive magnet apparatus according to claim 1, wherein the induction coil is installed inside the radiation heat shields.

3. The superconductive magnet apparatus according to claim 1, wherein the induction coil is installed inside the vacuum container.

4. The superconductive magnet apparatus according to claim 1, wherein the induction coil is installed inside a magnet shield arranged outside the vacuum container.

5. The superconductive magnet apparatus according to claim 1, wherein the switching element becomes active when a voltage higher than a predetermined value is excited in the induction coil.

6. The superconductive magnet apparatus according to claim 1, wherein the switching element becomes active when a voltage higher than a predetermined value is excited between taps taken out from two predetermined positions of the superconductive coil.

7. The superconductive magnet apparatus according to claim 1 or 6, wherein a plurality of induction coils are provided.

8. The superconductive magnet apparatus according to claim 5, wherein the switching element is a diode.

9. The superconductive magnet apparatus according to claim 6, wherein the switching element is a thyristor.

10. The superconductive magnet apparatus according to claim 5 or 6, wherein an operational voltage value is set in such a manner that the switching element does not becomes active upon magnetization or demagnetization of the superconductive magnet apparatus, but it becomes active only when a quench occurs in the superconductive coil.

* * * * *